United States Patent [19]

Mizuno et al.

[11] Patent Number: 5,032,554
[45] Date of Patent: Jul. 16, 1991

[54] SINTERED SILICON NITRIDE PRODUCTS

[75] Inventors: Kenichi Mizuno; Yo Tajima; Masakazu Watanabe, all of Nagoya, Japan

[73] Assignee: NGK Spark Plug Co., Aichi, Japan

[21] Appl. No.: 450,890

[22] Filed: Dec. 14, 1989

[30] Foreign Application Priority Data

Dec. 16, 1988 [JP] Japan ................... 63-316312

[51] Int. Cl.$^5$ .............................. C04B 35/58
[52] U.S. Cl. ........................ 501/97; 501/98
[58] Field of Search ..................... 501/97, 98

[56] References Cited

U.S. PATENT DOCUMENTS 4,407,970 10/1983 Komatsu ..................... 501/97
4,511,402 4/1985 Miura et al. .

FOREIGN PATENT DOCUMENTS 1042367 2/1989 Japan .

*Primary Examiner*—William R. Dixon, Jr.
*Assistant Examiner*—Sue Hollenbeck
*Attorney, Agent, or Firm*—Sughrue, Mion, Zinn, Macpeak & Seas

[57] ABSTRACT

A sintered silicon nitride product comprises from 72 to 98% by weight of silicon nitride, from 1 to 8% by weight of vanadium pentoxide, and from 1 to 20% by weight of one or more oxides of rare earth elements. The vanadium pentoxide and the oxide of rare earth elements accelerate the densification of the sintered product, and provide high strength at high temperature as well as excellent oxidation resistance to the sintered product.

7 Claims, 1 Drawing Sheet

FIG.IA
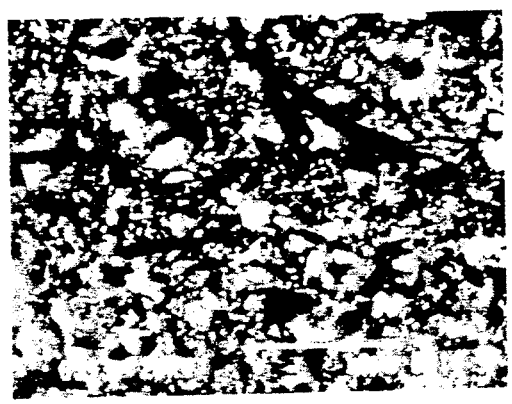
FIG.IB
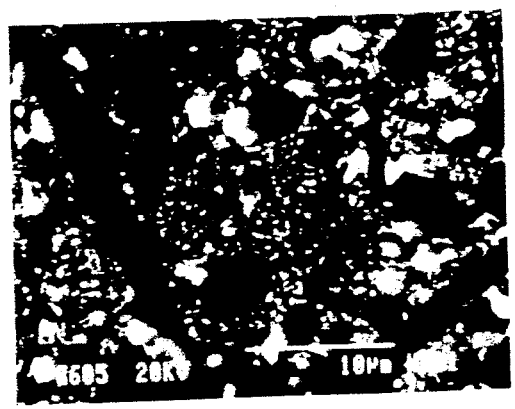

SINTERED SILICON NITRIDE PRODUCTS

BACKGROUND OF THE INVENTION

This invention relates to sintered silicon nitride products having high strength at high temperatures and excellent oxidation resistance.

Sintered silicon nitride products have excellent properties such as mechanical strength, heat and corrosion resistance, etc., and they are used as high temperature structural materials, such as for parts of automotive engines, gas turbines, etc., which require heat resistance and oxidation resistance.

Silicon nitride has a poor sinterability because of its strong covalent bond. Therefore, sintered silicon nitride products have been fabricated by using sintering aids such as magnesium oxide (MgO), aluminum oxide ($Al_2O_3$), zirconium dioxide ($ZrO_2$), oxide of rare earth elements, etc..

However, when the metallic oxides such as MgO, $Al_2O_3$, and/or $ZrO_2$ is used as sintering aids, low-melting point glass phase is formed as a grain boundary phase, resulting in degradation of strength at high temperatures and inferior oxidation resistance.

When the oxides of any rare earth elements are used as sintering aid, hot-pressing process is required to obtain dense sintered products, because these sintering aids are less effective in densification than other sintering aids.

The nature and functioning of sintering aids to be added in fabricating sintered products have been extensively studied, and a sintering aid excellent in sinterability has been developed.

SUMMARY OF THE INVENTION

The object of this invention is to provide sintered silicon nitride products having high mechanical strength at high temperatures and excellent oxidation resistance.

This object is attained by a sintered silicon nitride product comprising from 72% to 98% by weight of silicon nitride ($Si_3N_4$), from 1% to 8% by weight of vanadium (V) element calculated as vanadium pentoxide ($V_2O_5$), and from 1% to 20% by weight of one or more oxides of rare earth elements.

As a sintering aid, from 1% to 20% by weight of the oxide of rare earth elements is added. Less than 1% by weight of the oxide of rare earth elements cannot provide its aiding effect. On the other hand, when the oxide of rare earth elements exceeds 20% by weight, the mechanical strength of the resulting sintered products is deteriorated. When the amount of the oxide of rare earth elements is further increased, the increasing amount of melilite type compound ($R_2Si_3O_3N_4$, R:rare earth element) harmful to the oxidation at medium temperatures from 700° C. to 1000° C. tends to be formed. The resulting sintered products thus exhibit an insufficient oxidation resistance. Consequently, from 1% to 15% by weight of the oxide of rare earth elements is best.

For V element, its oxide is an effective sintering aid. By using this sintering aid, the sintered products with high density can be easily obtained by gas pressure sintering process and processes other than a hot-pressing process, through which a product having a complicated shape is difficult to sinter. By adding the oxide of V element, oxygen is released in the sintered products, $R_2Si_3O_3N_4$ is prevented from generating, and vanadium silicide ($VSi_2$), vanadium trisilicide ($V_5Si_3$), and/or other silicide as generated in the grain boundary. The melting points of these silicides are 1600° C. or higher. Consequently, the sintered products with the silicides are generated in the grain boundary can maintain strength at high temperatures. Since the silicide is uniformly dispersed in the grain boundary, $Si_3N_4$ powder is inhibited from growing, thereby enhancing the mechanical strength of the sintered products.

Less than 1% by weight of $V_2O_5$ cannot provide its aiding effect or inhibit the melilite compound from generating. When $V_2O_5$ exceeds 8% by weight, vanadium silicides are formed excessively so that they disperse nonuniformly and cohere to each other in the grain boundary. The strength of the sintered products at room temperature and high temperatures is deteriorated accordingly.

BRIEF DESCRIPTION OF THE DRAWING

FIG. 1A shows back scattered electron image of a sintered product for a fourth embodiment of this invention.

FIG. 1B shows back scattered electron image of a sintered product as a reference test sample for the fourth embodiment.

DETAILED DESCRIPTION OF THE PREFERRED EMBODIMENTS

EMBODIMENT 1

$Si_3N_4$ powder in the α-phase having an average particle size of 0.7 micron was blended with yttrium oxide powder ($Y_2O_3$) having an average particle size of two microns and $V_2O_5$ having an average particle size of one micron or $Al_2O_3$ having an average particle size of one micron so as to obtain sample compositions 1-4 as shown in Table 1. After mixing by a ball mill and dying, the mixture was sintered under a pressure of 200 kg/cm² and for one hour at 1800° C. by a hot-pressing process. The properties of resulting sintered products of 35x35x5mm were measured as follows. The results are shown in Table 1.

The flexural strength at three points on the test samples was measured at a room temperature and 1300° C. according to JIS R-1601 and JIS R-1604.

The oxidation test was carried out at 1,000° C. and 1,350° C., respectively, for 100 hours in air. Weight gain of test samples of 3x4x35mm after oxidation test was measured.

As shown in Table 1, the test samples No. 1 and 2 for this embodiment resulting from the hot-pressing process have excellent properties: a strength equal to or higher than 90 kg/mm² at 1,300° C., and a weight gain less than 0.1 mg/cm² after oxidation at 1,000° C. and 1,350° C.

On the other hand, $Al_2O_3$ is added to a reference test sample No.3, and low-melting point glass phase is generated in the grain boundary. The strength of the reference test sample No.3 at the room temperature deteriorates at 1,300° C. Only $Y_2O_3$ is added to a reference test sample No.4, and melilite phase is generated. The reference test sample No.4 gains much weight after oxidation at 1,000° C. and its oxidation resistance becomes inferior.

TABLE 1

Properties of Sintered Products through Hot-pressing Process

| | SAMPLE NO. | COMPOSITION (% BY WEIGHT) | | | | FLEXURAL STRENGTH (kg/mm$^2$) | | WEIGHT GAIN AFTER OXIDATION (mg/cm$^2$) | |
|---|---|---|---|---|---|---|---|---|---|
| | | Si$_3$N$_4$ | Y$_2$O$_3$ | OTHERS | | ROOM TEMP. | 1300° C. | 1000° C. | 1350° C. |
| EMBOD. | 1 | 94 | 4 | V$_2$O$_5$ | 2 | 103 | 97 | 0.02 | 0.06 |
| | 2 | 90 | 6 | V$_2$O$_5$ | 4 | 107 | 91 | 0.06 | 0.08 |
| REFER. | 3 | 94 | 4 | Al$_2$O$_3$ | 2 | 105 | 42 | 0.13 | 0.81 |
| | 4 | 94 | 6 | — | | 101 | 96 | 0.25 | 0.09 |

EMBODIMENT 2

In the same way as the first embodiment, Si$_3$N$_4$ powder in the α-phase was blended with V$_2$O$_5$ having an average particle size of one micron. An oxide of rare earth elements with a purity of 99.9% was also blended so as to obtain sample compositions as shown in Table 2. After drying, the mixture powder was molded under a hydrostatic pressure of 2 ton/cm$^2$ to obtain a product of 10x10x50mm and was sintered in nitrogen gas under a pressure of five atm at 1900° C. for two hours. The relative densities of the resulting sintered products are shown in Table 2.

As shown in Table 2, V$_2$O$_5$ in the range specified in this invention enhances the sinterability. The test samples No.5 through No.9 for this embodiment have relative densities exceeding 98%.

On the other hand, reference test samples No.10 through No.13 contain less than 1% by weight of V$_2$O$_5$ or less than 1% by weight of the oxide of rare earth elements. These sintering aids can exhibit no sintering effect due to their small amount. The reference test samples No.10 through No.13 have low relative densities between 80% and 85%, and opened pores remain in the reference test samples.

The sintered product was resintered in a nitrogen gas under a pressure of 100 atm at 1800° C. for two hours.

The properties of the resulting sintered product were measured as follows. The results are shown in Table 3.

The flexural strength at three points on the test samples was measured at the room temperature and 1350° C. according to JIS R-1601 and JIS R-1604.

The oxidation test was carried out at 1,000° C. and 1,350° C., respectively, for 100 hours in air. Weight gain of test samples of 3x4x35mm after oxidation test was calculated.

As shown in Table 3, test samples No.14 through No.22 resulting from the two-step gas-pressure sintering process have excellent properties: a strength higher than 70 kg/mm$^2$ at 1,300° C., and a weight gain less than 0.2 mg/cm$^2$ after oxidation at 1,000° C. and 1,350° C. In this way, the strength deterioration when the room temperature rises to 1,300° C. is small. The weight gain after oxidation is also small.

On the other hand, reference test samples No.23 through No.25 contain less than 1% by weight of V$_2$O$_5$ or less than 1% by weight of the oxide of rare earth elements. These sintering aids exhibit no sintering effect due to their small amount. The reference test samples are thus prevented from densification, their strength is

TABLE 2

Sinterability of Gas-pressure Sintering

| | SAMPLE NO. | COMPOSITION (% BY WEIGHT) | | | | RELATIVE DENSITY (%) |
|---|---|---|---|---|---|---|
| | | Si$_3$N$_4$ | OXIDE OF RARE EARTH ELEMENTS | | V$_2$O$_5$ | |
| EMBODIMENT | 5 | 94 | Y$_2$O$_3$ | 4 | 2 | 98.8 |
| | 6 | 90 | Y$_2$O$_3$ | 6 | 4 | 99.2 |
| | 7 | 90 | Er$_2$O$_3$ | 9 | 1 | 98.4 |
| | 8 | 79 | Er$_2$O$_3$ | 15 | 6 | 99.5 |
| | 9 | 94 | Sc$_2$O$_3$ | 2 | 4 | 98.6 |
| REFERENCE | 10 | 90 | Y$_2$O$_3$ | 10 | — | 83.4 |
| | 11 | 94 | Y$_2$O$_3$ | 6 | — | 81.2 |
| | 12 | 93.5 | Y$_2$O$_3$ | 6 | 0.5 | 85.4 |
| | 13 | 93.5 | Y$_2$O$_3$ | 0.5 | 6 | 79.6 |

EMBODIMENT 3

In the same way as the second embodiment, Si$_3$N$_4$ powder in the α-phase was blended with V$_2$O$_5$ having an average particle size of one micron and the oxide of rare earth elements with a purity of 99.9% so as to obtain sample compositions as shown in Table 3. After drying, the mixture powder was molded under a hydrostatic pressure of 2 ton/cm$^2$ to obtain a product of 50x50x10mm, and was first sintered in a nitrogen gas under a pressure of two atm at 1800° C. for two hours.

low, and their oxidation resistance is inferior. The reference test sample No.26, which comprises 10% by weight of V$_2$O$_5$ exceeding the range specified for this invention, has low strength at the room temperature and 1,300° C. due to excess vanadium silicide. The reference test sample No.27 contains much oxide of rare earth elements and melilite type compound is generated, thus deteriorating its resistance to oxidation at 1,000° C. and its strength at the room temperature and high temperatures.

TABLE 3

Properties of Gas-pressure Sintered Products

| | SAMPLE NO. | COMPOSITION (% BY WEIGHT) | | | RELATIVE DENSITY (%) | FLEXURAL STRENGTH (kg/mm$^2$) | | WEIGHT GAIN AFTER OXIDATION (mg/cm$^2$) | |
|---|---|---|---|---|---|---|---|---|---|
| | | Si$_3$N$_4$ | OXIDE OF RARE EARTH ELEMENTS | V$_2$O$_5$ | | ROOM TEMP. | 1300° C. | 1000° C. | 1350° C. |
| EMBODIMENT | 14 | 94 | Y$_2$O$_3$ 4 | 2 | 100 | 92 | 88 | 0.05 | 0.09 |
| | 15 | 92 | ↑ ↑ | 4 | ↑ | 90 | 84 | 0.05 | 0.10 |
| | 16 | 90 | ↑ ↑ | 6 | ↑ | 86 | 79 | 0.04 | 0.10 |
| | 17 | 90 | Er$_2$O$_3$ 9 | 1 | ↑ | 95 | 86 | 0.09 | 0.11 |
| | 18 | 79 | Er$_2$O$_3$ 15 | 6 | ↑ | 83 | 74 | 0.11 | 0.13 |
| | 19 | 84 | Yb$_2$O$_3$ 8 | 8 | ↑ | 81 | 70 | 0.08 | 0.11 |
| | 20 | 94 | Sc$_2$O$_3$ 1 / Y$_2$O$_3$ 1 | 4 | ↑ | 88 | 76 | 0.01 | 0.06 |
| | 21 | 94 | Y$_2$O$_3$ 2 / Er$_2$O$_3$ 2 | 2 | ↑ | 96 | 89 | 0.04 | 0.07 |
| | 22 | 81 | Er$_2$O$_3$ 8 / Yb$_2$O$_3$ 8 | 3 | ↑ | 87 | 81 | 0.12 | 0.15 |
| REFERENCE | 23 | 94 | Y$_2$O$_3$ 6 | — | 89 | 59 | 55 | 0.34 | 0.24 |
| | 24 | 93.5 | ↑ | 0.5 | 92 | 62 | 56 | 0.22 | 0.28 |
| | 25 | 93.5 | Y$_2$O$_3$ 0.5 | 6 | 84 | 65 | 48 | 0.18 | 0.33 |
| | 26 | 86 | Y$_2$O$_3$ 4 | 10 | 98 | 77 | 54 | 0.13 | 0.19 |
| | 27 | 76 | Y$_2$O$_3$ 22 | 2 | 100 | 74 | 52 | 1.42 | 0.55 |

EMBODIMENT 4

Material powders the same as those used for the first embodiment and chromium oxide (Cr$_2$O$_3$) are used. Specifically, Si$_3$N$_4$ powder in the α-phase was blended with Y$_2$O$_3$ powder having an average particle size of two microns, V$_2$O$_5$ having an average particle size of one micron or Cr$_2$O$_3$ having an average particle size of one micron so as to obtain sample compositions as shown in Table 4. After drying, the mixture was molded under a hydrostatic pressure of 2 ton/cm$^2$ to obtain a product of 10x10x50mm and sintered in nitrogen gas under a pressure of ten atm at 1850° C. for four hours.

The cross section of the sintered products resulting from gas-pressure sintering was polished and observed using a scanning electron microscope (SEM). Compositions shown in FIGS. 1A and 1B were observed. Properties were measured. The results are shown in Table 4.

TABLE 4

| EXAMPLE | SAMPLE NO. | COMPOSITION (% BY WEIGHT) | | | RELATIVE DENSITY (%) | FLEXURAL STRENGTH AT ROOM TEMPERATURE (kg/mm$^2$) |
|---|---|---|---|---|---|---|
| | | Si$_3$N$_4$ | Y$_2$O$_3$ | OTHERS | | |
| EMBODI. | 28 | 94 | 4 | V$_2$O$_5$ 2 | 99.5 | 90 |
| REFER. | 29 | 94 | 4 | Cr$_2$O$_3$ 2 | 98.2 | 81 |

In FIGS. 1A and 1B, luminescent spots are vanadium silicide and chromium silicide, dark columnar grains are Si$_3$N$_4$, and white regions surrounding the grains are the grain boundary of yttrium compound. As shown in FIG. 1A, in the test sample No.28 for this embodiment, vanadium silicide grains having an average particle size of less than one micron are uniformly dispersed, and grain growth of Si$_3$N$_4$ grains is inhibited.

On the other hand, as shown in FIG. 1B, in the reference test sample No.29, chromium silicide and Si$_3$N$_4$ grains grow remarkably. As shown in Table 4, the reference test sample No.29 has lower strength at the room temperature, as compared with the test sample No.28.

Consequently, the sintering aid of V$_2$O$_5$ inhibits the grain growth of Si$_3$N$_4$ grains and enhances the mechanical strength of the sintered products.

While the invention has been described in detail and with reference to specific embodiments thereof, it will be apparent to one skilled in the art that various changes and modifications can be made therein without departing from the spirit and scope thereof.

What is claimed is:

1. A sintered silicon nitride product consisting essentially of:
   from 72% to 98% by weight of silicon nitride;
   from 1% to 8% by weight of vanadium compound calculated as vanadium pentoxide; and
   from 1% to 20% by weight of at least one oxide of rare earth elements.

2. The sintered silicon nitride product of claim 1, wherein the at least one oxide of rare earth elements is chosen from the group consisting of Y$_2$O$_3$, Er$_2$O$_3$, Yb$_2$O$_3$, and Sc$_2$O$_3$.

3. The sintered silicon nitride product of claim 2, wherein the oxide of rare earth elements is Y$_2$O$_3$ having an average particle size of 2 microns.

4. The sintered silicon nitride product of claim 1, wherein the at least one oxide of rare earth elements is 99.9% pure.

5. The sintered silicon nitride product of claim 1, wherein the silicon nitride is Si$_3$N$_4$ powder in the alpha-phase having an average particle size of 0.7 microns.

6. The sintered silicon nitride product of claim 5, wherein the vanadium pentoxide has an average particle size of 1 micron.

7. The sintered silicon nitride product of claim 1, wherein the sintered silicon nitride product is sintered in a two-step gas-pressure sintering process comprising a first sintering in a nitrogen gas atmosphere under pressure, followed by resintering of the sintered product obtained in a nitrogen gas atmosphere under a higher pressure.

* * * * *